United States Patent
Christ et al.

(10) Patent No.: US 10,193,348 B2
(45) Date of Patent: Jan. 29, 2019

(54) ARRANGEMENT AND INSTALLATION FOR TRANSMITTING ELECTRIC POWER WITH A RESERVE RECTIFIER

(71) Applicant: SIEMENS AKTIENGESELLSCHAFT, Munich (DE)

(72) Inventors: Timo Christ, Heroldsbach (DE); Peter Menke, Oberfuellbach (DE); Frank Schettler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 15/116,901

(22) PCT Filed: Feb. 6, 2014

(86) PCT No.: PCT/EP2014/052353
§ 371 (c)(1),
(2) Date: Aug. 5, 2016

(87) PCT Pub. No.: WO2015/117656
PCT Pub. Date: Aug. 13, 2015

(65) Prior Publication Data
US 2017/0170663 A1   Jun. 15, 2017

(51) Int. Cl.
*H02J 3/38* (2006.01)
*H02M 7/06* (2006.01)

(52) U.S. Cl.
CPC ............... *H02J 3/386* (2013.01); *H02M 7/06* (2013.01); *Y02E 10/763* (2013.01)

(58) Field of Classification Search
CPC ..... H02J 3/386; H02J 9/04; H02M 7/06; Y02E 10/763
See application file for complete search history.

(56) References Cited

U.S. PATENT DOCUMENTS

| 2005/0225090 A1 | 10/2005 | Wobben |
| 2016/0013653 A1 | 1/2016 | Dorn et al. |

FOREIGN PATENT DOCUMENTS

| DE | 10044096 A1 | 4/2002 |
| DE | 102008022077 A1 | 11/2009 |
| WO | 2008039121 A1 | 4/2008 |
| WO | 2009135736 A1 | 11/2009 |
| WO | 2014131457 A1 | 9/2014 |

*Primary Examiner* — Rexford Barnie
*Assistant Examiner* — Thai Tran
(74) *Attorney, Agent, or Firm* — Laurence Greenberg; Werner Stemer; Ralph Locher (57) ABSTRACT

An arrangement having a first group of rectifiers, which form a series circuit on the DC voltage side and which can be connected to a first AC voltage network, and having a reserve rectifier that, in the event of a fault in one of the rectifiers, can be electrically connected by suitable switching apparatuses to the first AC voltage network and on the DC voltage side to a first DC voltage line to form an augmented series circuit with the rectifiers. An installation for transmitting electric power between at least one first wind farm with at least one wind power installation and the first power supply system, including the first group of rectifiers, is able to be connected to the first wind farm via the first AC voltage network.

15 Claims, 7 Drawing Sheets

ARRANGEMENT AND INSTALLATION FOR TRANSMITTING ELECTRIC POWER WITH A RESERVE RECTIFIER

BACKGROUND OF THE INVENTION

Field of the Invention

For energy transmission, an energy transmission installation for use in wind turbine installations is disclosed, for example, in the article by S. Bernal-Perez et al., "Off-shore wind farm grid connection using a novel diode-rectifier and VSC-inverter based HVDC transmission link", IECON, 2011, pp 3186-3191. The known energy transmission installation comprises an unregulated converter, configured as a diode rectifier, which is connected to a DC voltage intermediate circuit on the DC voltage side. The DC voltage intermediate circuit extends from the diode rectifier to a voltage injection converter, also described in English as a "Voltage Source Converter" (VSC). The unregulated rectifier is connected to a wind farm of the wind turbine installation via transformers and an AC voltage network. For the purposes of reactive power compensation, passive filter elements are connected to the AC voltage network of the wind farm.

The transmission of electrical energy using DC is economically advantageous in many applications, specifically for transmission over long distances. These applications include, for example, the previously described connection of an offshore wind farm to a land-based supply network, the supply of energy to offshore facilities (for example oil platforms) from land, or the connection of two land-based networks which are separated by a sea.

DC transmission installations frequently employ two self-commutated converters, which are interconnected by means of a DC link. An arrangement of this type permits a bi-directional flow of power, even between low-capacity AC voltage networks such that, for example, the stabilization of a low-capacity AC voltage network can be achieved by means of a high-capacity AC voltage network.

Disadvantageously, however, self-commutated converters are associated with high infrastructural complexity and high costs.

As a result of the increasing weight and volume of converters, the installation of such converters in maritime offshore applications is also a cost-intensive operation.

The use of an unregulated rectifier permits the transmission of power in one direction only, but is advantageous in that, in comparison with a self-commutated converter, the associated losses, volume and weight of the rectifier can be significantly reduced. Moreover, in an unregulated rectifier, relatively compact power semiconductors can be used. The control and cooling of the unregulated rectifier can also be configured in a less complex arrangement. If the first AC voltage network is connected, for example, to an energy generating installation, such as a wind farm, the direction of power transmission is essentially predetermined, such that this restriction does not constitute a serious disadvantage.

BRIEF SUMMARY OF THE INVENTION

The object of the invention is the proposal of an arrangement with a rectifying function, and an installation for the transmission of electrical energy which is characterized by relatively high operational security.

According to the invention, the object is fulfilled by an arrangement having a first group of rectifiers which form a series circuit on the DC voltage side and which can be connected to a first AC voltage network, and having a reserve rectifier that, in the event of a fault on one of the rectifiers, can be electrically connected by means of appropriate switching devices to the first AC voltage network, and on the DC voltage side to a first DC voltage line to form an augmented series circuit with the rectifiers.

The arrangement according to the invention has an advantage in that the series-connected rectifiers can be rated for lower voltages. By the use of a plurality of rectifiers, the arrangement can be more easily adapted to the respective requirements. Moreover, each of the rectifiers is comparatively light, and can therefore be relatively cost-effectively installed, for example, on the base structures provided for this purpose, for example the base structure of one of the wind turbines. The respective rectifier is connected, for example, via a dedicated transformer for this purpose, either to a busbar of the AC voltage network or to various phase lines of the AC voltage network whereby, for example, a number of wind turbines can be arranged in each phase. A further advantage is provided in that, in the event of a fault on one rectifier, for example the failure of that rectifier, an interruption of the entire power flow between the AC voltage network which is connected to the wind farm and the energy supply network is prevented. In the case of a connection of an offshore wind farm, the arrangement according to the invention can also eliminate the fundamental problem whereby, in the event of connection via a single high-voltage DC (HVDC) transmission link, the failure of one cable or rectifier entails the loss of a very high network injection capacity.

However, the scope of application of the invention extends beyond the connection of wind farms. The arrangement according to the invention can also be employed in other energy supply installations involving other energy generating units.

In the event of a fault on one of the rectifiers, for example in the case of damage to the rectifier or faults on its AC voltage side, the reserve rectifier can be brought into service as a replacement for the defective rectifier, by means of which a constant voltage on the DC voltage side of the series circuit of the rectifiers can be maintained, and a consistent load distribution on the AC voltage side can be ensured. By this arrangement, in the event of a fault on a rectifier, transmission at full capacity can be maintained, whereby the resulting costs will be lower, in comparison with a fully-redundant arrangement.

According to one advantageous embodiment of the invention, the arrangement also comprises a second group of rectifiers forming a series circuit on the DC voltage side, which can be connected to a second AC voltage network, wherein the reserve rectifier, in the event of a fault on one of the rectifiers in the first group, is electrically connectable by means of appropriate switching devices to the first AC voltage network, and on the DC voltage side to a second DC voltage line to form an augmented series circuit with the rectifiers in the first group. In other words, the two groups share a reserve rectifier, thereby resulting in a substantial reduction in costs.

Advantageously, the reserve rectifier, in the event of a fault on one of the rectifiers in the second group, is electrically connectable by means of appropriate switching devices to the second AC voltage network, and on the DC voltage side to the second DC voltage line to form an augmented series circuit with the rectifiers in the second group.

Moreover, the reserve rectifier, in the event of a fault on one of the rectifiers in the second group, is preferably electrically connectable by means of appropriate switching devices to the second AC voltage network, on and the DC voltage side to the first DC voltage line to form an augmented series circuit with the rectifiers in the second group.

Preferably, moreover, in the event of a fault on the first DC voltage line, the first group of rectifiers is connectable by means of appropriate switching devices to the second DC voltage line. Moreover, it is particularly preferred that, in the event of a fault on the second DC voltage line, the second group of rectifiers is connectable by means of appropriate switching devices to the first DC voltage line. Accordingly, the reserve rectifier and the switching devices can be used to prevent any functional restriction of the installation, even in the event of faults on the DC voltage lines.

According to a preferred form of embodiment, the arrangement also comprises a first network- or self-commutated converter, whereby the first converter is electrically connectable to the first DC voltage line and, on the AC voltage side, to a first energy supply network.

According to another preferred form of embodiment, the arrangement also comprises a second network- or self-commutated converter, whereby the second self-commutated converter is electrically connectable to the second DC voltage line and, on the AC voltage side, to a second energy supply network. The functionality of the arrangement described can thus be exploited in the same way, in the event of faults on the converters.

The configuration described can naturally be extended to more than two groups of rectifiers, whereby the reserve rectifier is common to all the groups, as described above. Likewise, any interconnection of groups, with the reserve rectifier arranged between the latter, is possible.

The first and second energy supply networks can also be interconnected.

The abovementioned object is also fulfilled by an installation for the transmission of electric power between at least a first wind farm, with at least one wind turbine, and the first energy supply network, comprised of the abovementioned arrangement, wherein, according to the invention, the first group of rectifiers is connectable to the first wind farm via the first AC voltage network.

According to a preferred form of embodiment, the installation is also designed for the transmission of electric power between a second wind farm and the second energy supply network, wherein the second group of rectifiers is connectable to the second wind farm via the second AC voltage network.

The control of load flows in the individual AC voltage lines and DC voltage lines can be assumed, for example, by a master controller, which employs a corresponding control algorithm. The master controller thus ensures that the desired load flows do not result in the overloading of specific lines. To this end, the master controller transmits the relevant target power values to the converters or to a wind farm controller, which effects the setting of target voltages for the relevant target power values by means of a corresponding control algorithm.

According to one form of embodiment of the invention, the network- or self-commutated converters are arranged onshore, and the rectifiers are arranged in a sea or lake.

The rectifiers are preferably diode rectifiers. Diode rectifiers are particularly light-weight and cost-effective, both to manufacture and to operate.

Preferably, at least one self-commutated converter is a modular multi-stage converter. The modular multi-stage converter is provided with phase modules, the number of which matches the number of phases on the connected energy supply network. Each phase module is configured as a three-phase module, and comprises two external DC voltage terminals and a central AC voltage terminal. A phase module branch extends between the AC voltage terminal and each DC voltage terminal, provided with a series circuit of two-pole submodules. Each submodule is equipped with an energy store such as, for example, a single-pole capacitor, and with a power semiconductor circuit which is arranged in parallel with the latter. The power semiconductor circuit can be configured, for example, as a half-bridge or full-bridge circuit which is known to a person skilled in the art. Alternatively, network-commutated converters can also be used.

Appropriately, each rectifier is bridgeable by means of a bypass switch. To this end, each rectifier can preferably have two DC voltage terminals, which are interconnected by the closing of the bypass switch.

According to one exemplary embodiment of the invention, the installation comprises a plurality of groups of diode rectifiers and a plurality of converters, which are interconnected on the DC voltage side by DC voltage lines, wherein the DC voltage lines are interconnected in a multi-terminal or meshed network arrangement. In this case, the total power balance can be controlled by means of the master controller. The DC voltage in the DC voltage links is regulated with reference to the target capacity of the wind farm and the AC voltage in the AC voltage networks. In this manner, the configuration of a multi-terminal arrangement with the use of rectifiers, for example diode rectifiers, is possible.

BRIEF DESCRIPTION OF THE SEVERAL VIEWS OF THE DRAWING

Exemplary embodiments of the installation according to the invention are described in greater detail hereinafter, with reference to FIGS. 1 to 7.

DESCRIPTION OF THE INVENTION

Figure 1:
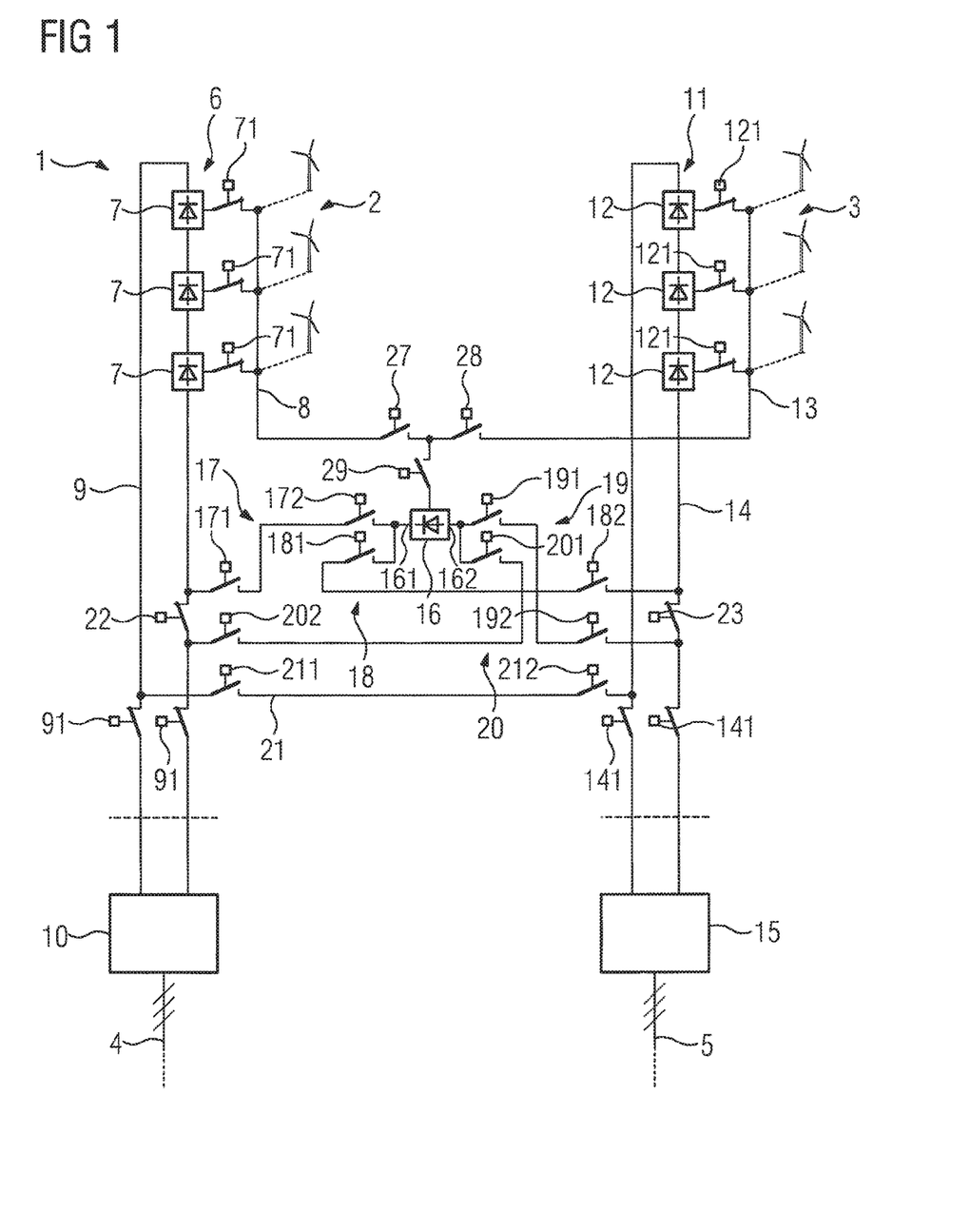
FIGS. 1 to 6 show a schematic representation of an exemplary embodiment of an installation according to the invention for the transmission of electric power.

Specifically, FIG. 1 shows an exemplary embodiment of an installation 1 according to the invention for the transmission of electric power between a first wind farm 2, a second wind farm 3 and a first and second energy supply network 4, 5.

The wind farms 2 and 3 represented in FIG. 1 are comprised of three schematically-represented wind turbines. It is naturally possible, however, to select any other appropriate number of wind turbines per wind farm, wherein each wind farm may also comprise a different number.

The installation 1 comprises a first group 6 of diode rectifiers 7 which are connectable respectively on the AC voltage side to a first AC voltage network 8 and, via the first AC voltage network 8, to the first wind farm 2 by means of a switching device 71. The diode rectifiers 7 are interconnected on the DC voltage side in a series circuit. The diode rectifiers 7 are also connectable via a first DC voltage line 9 to a self-commutated converter 10 by means of switching devices 91. The self-commutated converter 10 is connected on the AC voltage side to the first energy supply network 4. The rectifiers 7 and 12 are configured as diode rectifiers.

The installation 1 also comprises a second group 11 of diode rectifiers 12 which are connectable respectively on the AC voltage side to a second AC voltage network 13 and, via the first AC voltage network 13, to the second wind farm 3 by means of a switching device 121. The diode rectifiers 12 are interconnected on the DC voltage side in a series circuit. The diode rectifiers 12 are also connectable via a second DC voltage line 14 to a second self-commutated converter 15 by means of switching devices 141. The self-commutated converter 15 is connected on the AC voltage side to the second energy supply network 5.

A reserve rectifier 16, which is also a diode rectifier, is arranged between the first wind farm 2 and the second wind farm 3. The reserve rectifier 16 can be connected on the AC voltage side to the first AC voltage network 8 or to the second AC voltage network 13 by means of the switching devices 27, 28, 29.

On the DC voltage side, the reserve rectifier 16 is provided with two terminals 161 and 162.

The terminal 161 is connectable to the DC voltage line 9 by means of a switching device 17 with two switching elements 171, 172. The terminal 162 is also connectable to the DC voltage line 14 by means of a switching device 18 with two switching elements 181, 182.

The terminal 162 is connectable to the DC voltage line 14 by means of a switching device 19 with two switching elements 191, 192. The terminal 162 is also connectable to the DC voltage line 9 by means of a switching device 20 with two switching elements 201, 202.

The installation 1 also comprises a connecting line 21 with two switching elements 211, 212 for the connection of the DC voltage line 9 to the DC voltage line 14. The installation 1 is also provided with two further switching devices 22 and 23 for the interruption of the DC voltage line 9 and the DC voltage line 14 respectively.

With the installation 1 in normal duty, the switching devices 71 and 121 are closed, such that the rectifiers 7, 12 are connected to the AC voltage networks 8 or 13. The switching devices 91, 141, 22 and 23 are also closed. Accordingly, the first group 6 is connected on the DC voltage side to the first converter 10 and the second group 11 is connected to the second converter 15. All other switching devices are open. Accordingly, with the installation 1 in normal duty, the reserve rectifier is not connected on either the AC voltage side or the DC voltage side with one of the networks 2, 3 or one of the lines 9, 14.

The operation of the reserve rectifier is described in greater detail hereinafter, with reference to the exemplary cases shown in FIGS. 2 to 6.

Figure 2:
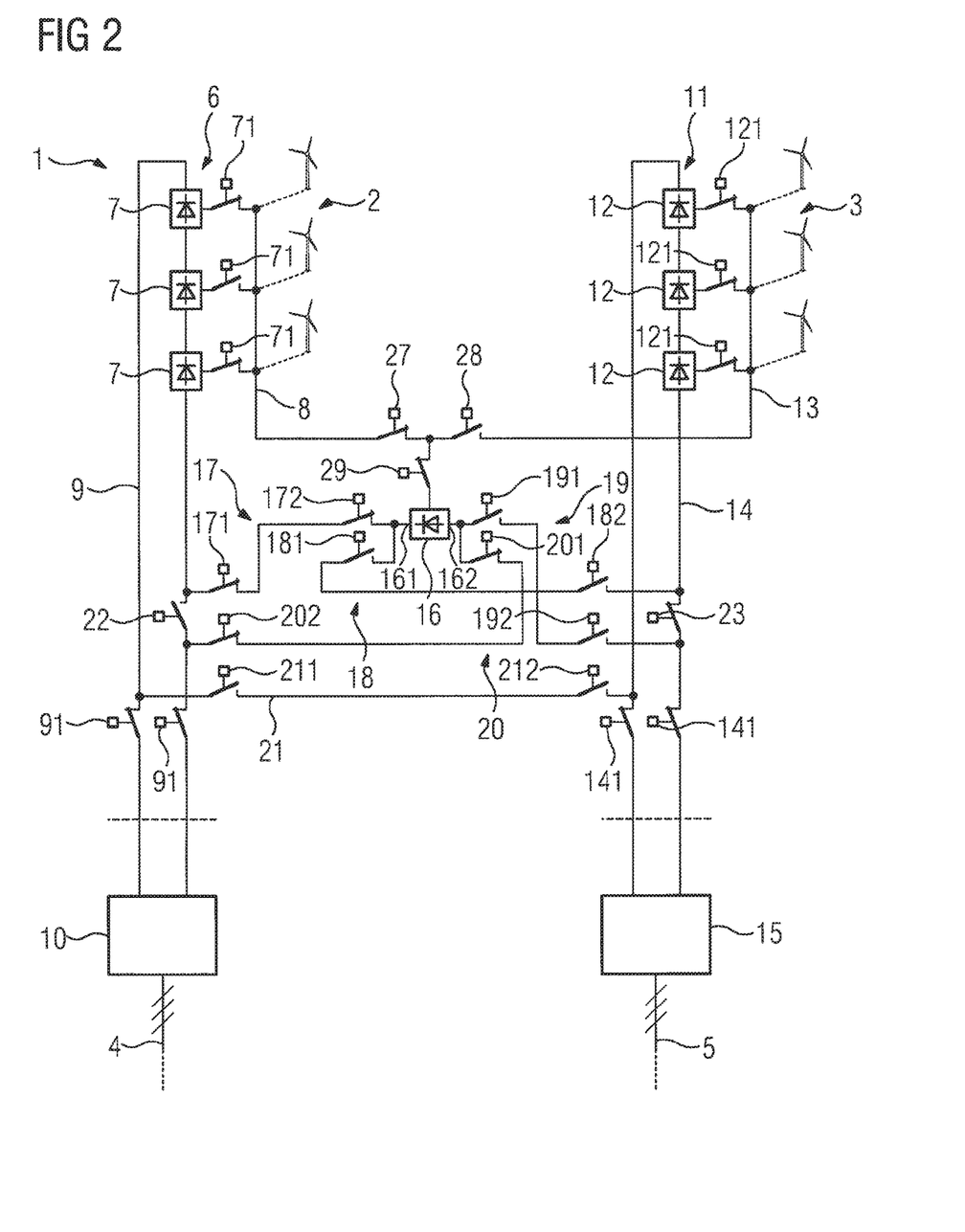

FIG. 2 shows the installation 1 from FIG. 1, wherein a fault has occurred on one of the rectifiers 7 in the first group 6 (in the representation shown in FIG. 2, it is the second rectifier from the top). Accordingly, the associated switching device 71 is open, such that the connection of the rectifier to the first AC voltage network 8 is interrupted.

In this case, the reserve rectifier 16 is connected on the AC voltage side to the first AC voltage network 8 by means of the closed switching devices 27 and 29. On the DC voltage side, the reserve rectifier 16 forms a series circuit with the first group 6 of rectifiers on the grounds that, by means of the switching device 17, wherein the switching elements 171, 172 are closed, the switching device 20, wherein the switching elements 201, 202 are also closed, it is correspondingly connected to the first DC voltage line 9, wherein the switching device 22 is open.

Figure 3:
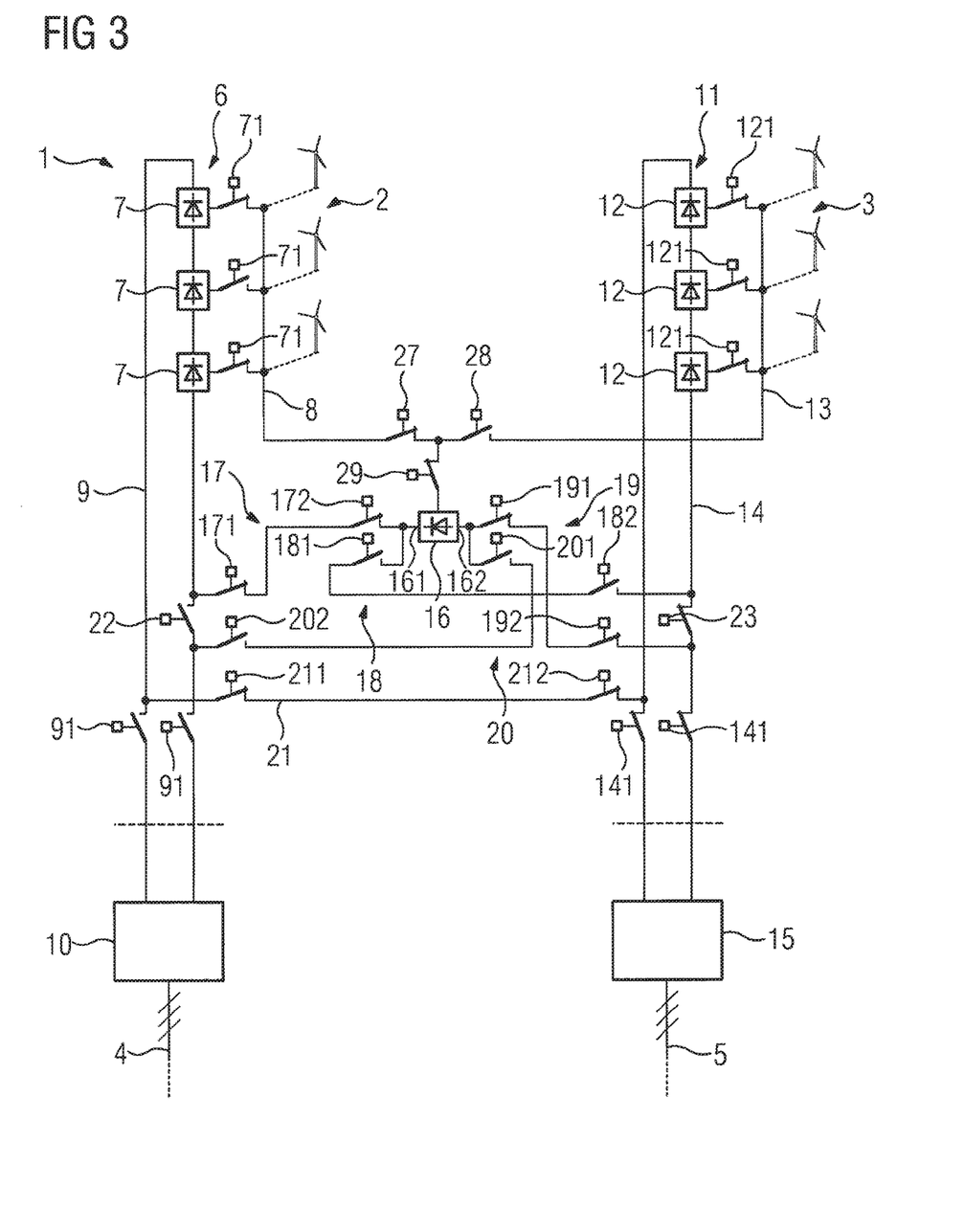

FIG. 3 shows the installation 1 in FIGS. 1 and 2, wherein FIG. 3 represents how, in the event of a fault on one of the rectifiers 7 in the first group 6 (the second from the top, as represented in FIG. 3), the reserve rectifier 16 is connected with the first group 6 and with the second DC voltage line 14.

The reserve rectifier is correspondingly connected, on the AC voltage side, with the first AC voltage network 8 by means of the closed switching devices 27 and 29. On the DC voltage side, the reserve rectifier 16 forms a series circuit with the first group 6 of rectifiers, wherein, by means of the switching device 17, wherein the switching elements 171, 172 are closed, it is connected to the first group 6 of rectifiers 7 and, by means of the switching device 19, wherein the switching elements 191, 192 are closed, it is connected to the second DC voltage line 14. At the same time, by means of the switching device 21 with the closed switching elements 211, 212, a connection is formed between the second DC voltage line 14 and the first group 6 of rectifiers 7.

Figure 4:
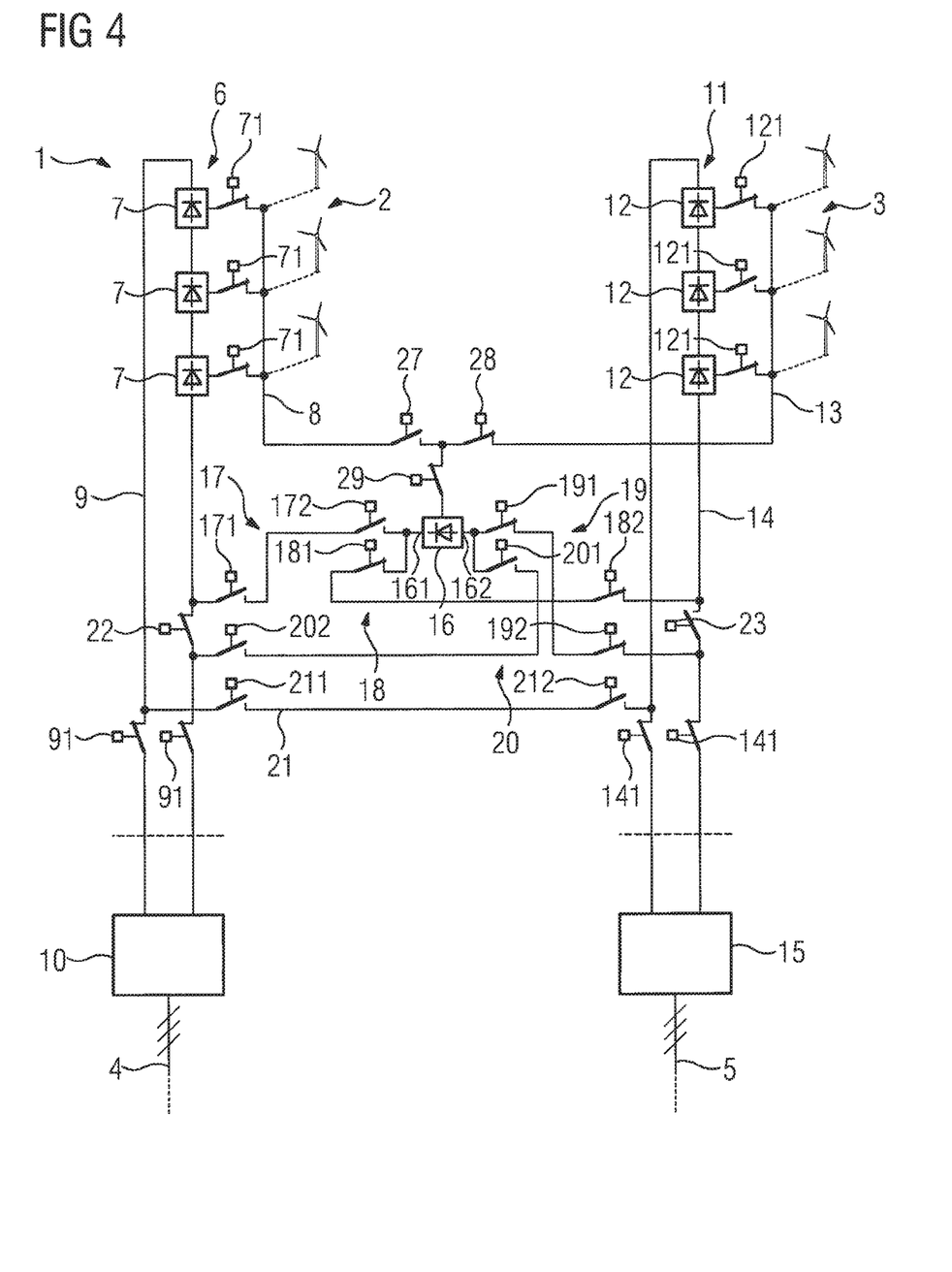

FIG. 4 shows the installation 1 from FIGS. 1 to 3, wherein a fault has occurred on one of the rectifiers 12 in the second group 11 of rectifiers (in the representation shown in FIG. 4, it is the second rectifier from the top). Accordingly, the associated switching device 121 is open, such that the connection of the rectifier to the second AC voltage network 13 is interrupted.

In this case, the reserve rectifier 16 is connected on the AC voltage side to the second AC voltage network 13 by means of the closed switching devices 28 and 29. On the DC voltage side, the reserve rectifier 16 forms a series circuit with the second group 11 of rectifiers on the grounds that, by means of the switching device 19, wherein the switching elements 191, 192 are closed, the switching device 18, wherein the switching elements 181, 182 are also closed, it is correspondingly connected to the second group 11, wherein the switching device 23 is open.

Figure 5:
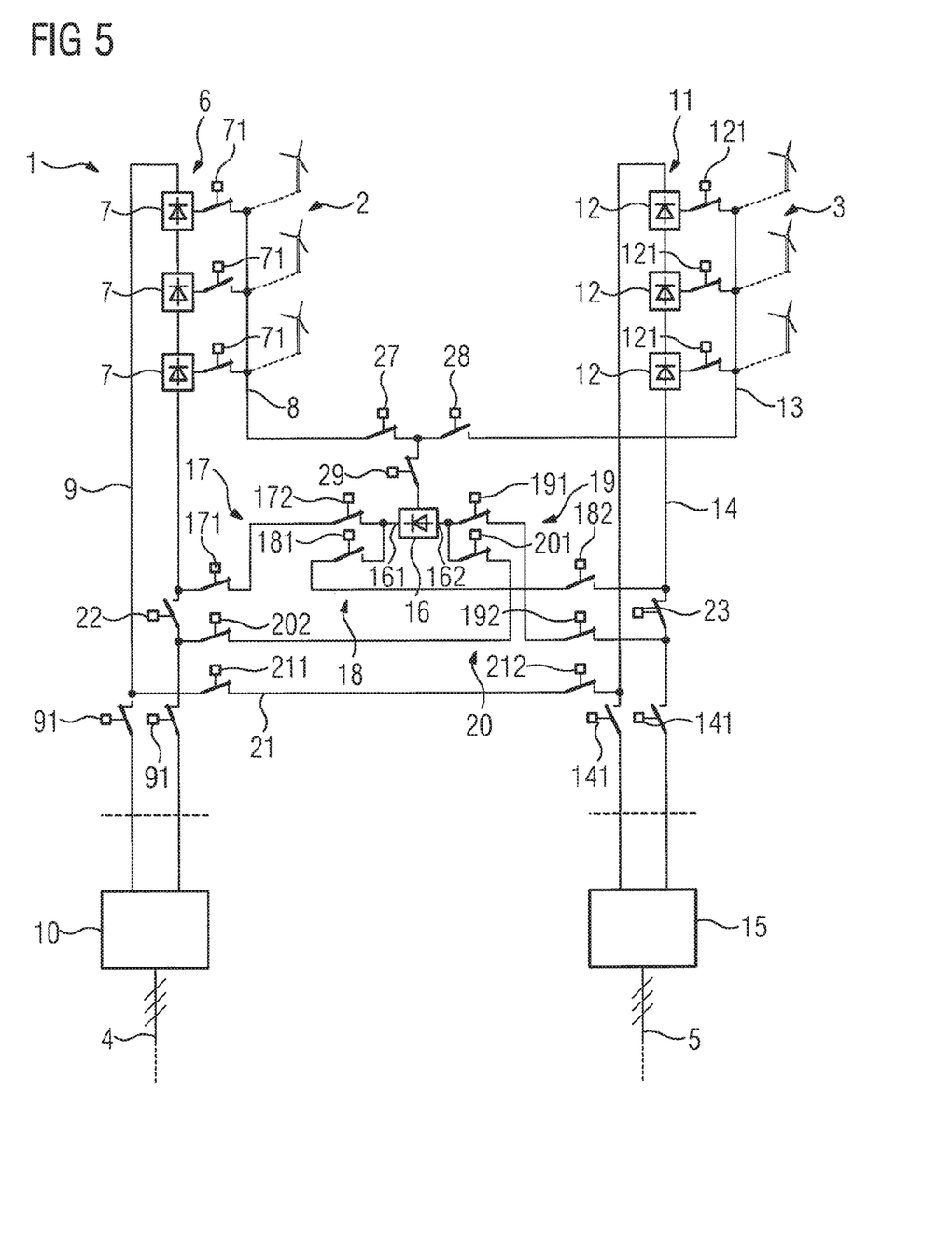

FIG. 5 shows the installation from FIGS. 1 to 4, wherein one of the rectifiers (the second from the top, in the representation shown) is defective. In FIG. 5, the reserve rectifier 16 replaces the defective rectifier 7. At the same time, the full transmission of electric power from the two wind farms 2 and 3 is routed via the first DC voltage line 9.

To this end, the switching devices 27 and 29 are closed, such that the reserve rectifier 16 is connected to the first AC voltage network 8. Moreover, the reserve rectifier 16 forms a series circuit with the first group 6 of rectifiers 7, whereby, to this end, it is connected with the first group 6 and the first DC voltage line 9 by means of the switching devices 17 and 20. The switching device 22 is in this case open. Moreover, the second group 11 is connected to the first DC voltage line 9 by means of the switching devices 21 and 19. The switching devices 141 are in this case open, and the switching device 23 is closed.

Figure 6:
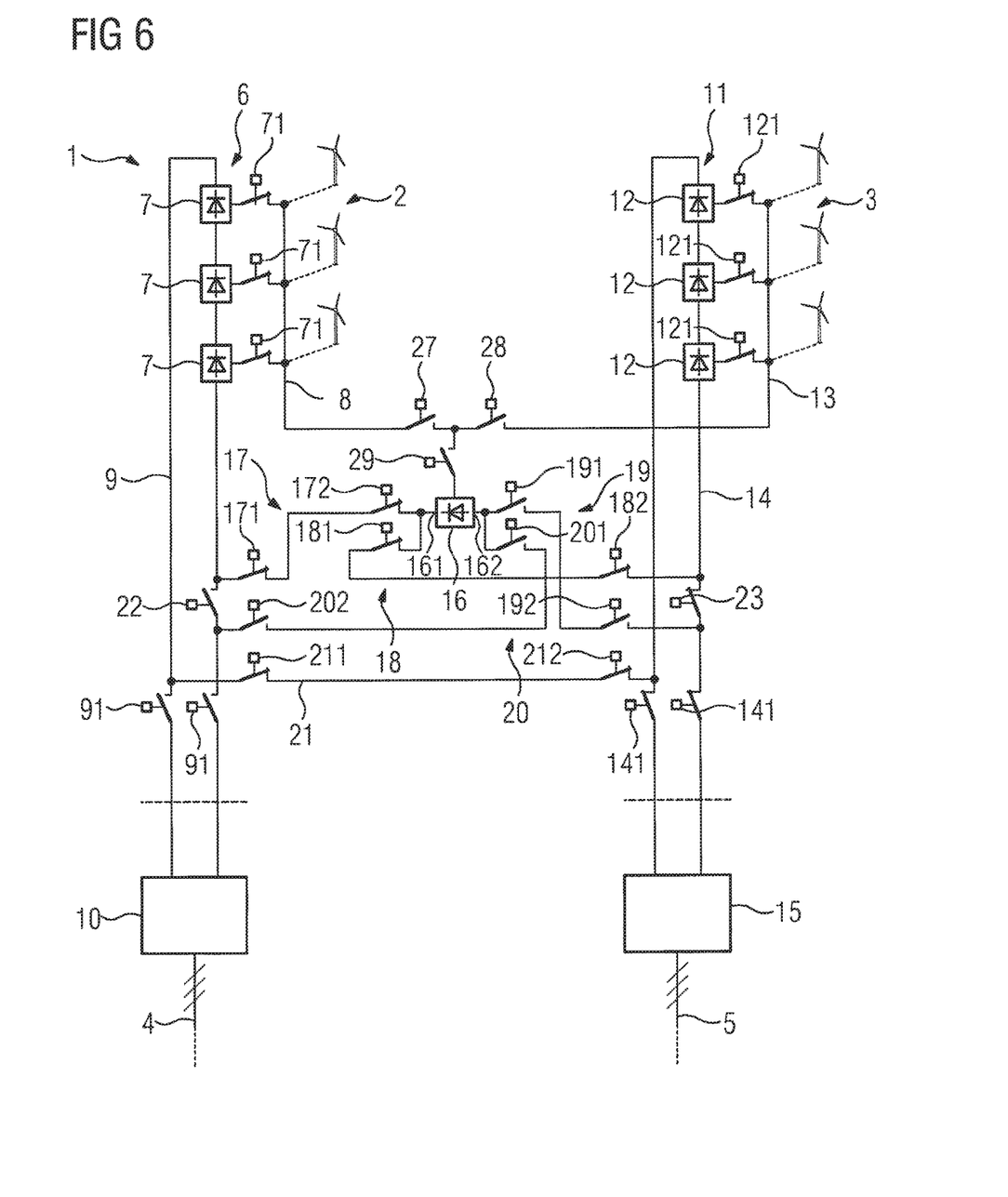

FIG. 6 represents the installation 1 from FIGS. 1 to 5, wherein the full transmission of electric power from the two wind farms 2 and 3 is routed via the second DC voltage line 14. To this end, the first group 6 of rectifiers 7 is connected to the second DC voltage line 14 by means of the switching devices 17, 18 and 21. The switching devices 91 are in this case open.

Figure 7:
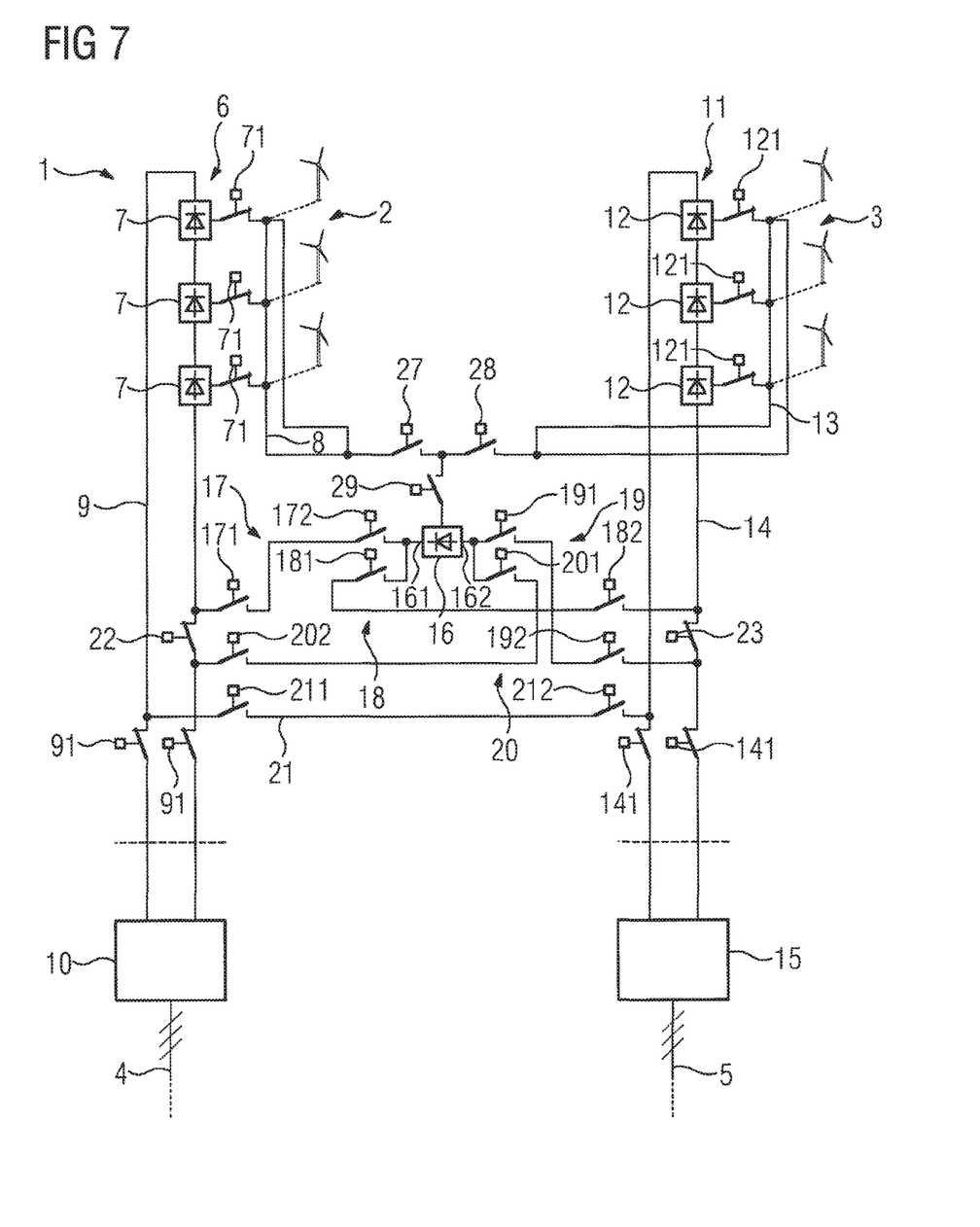
FIG. 7 shows a schematic representation of a further exemplary embodiment of the installation according to the invention.

FIG. 7 shows a second exemplary embodiment of the installation 1. The exemplary embodiment in FIG. 7 only differs from the exemplary embodiment in FIGS. 1 to 6 in that the first AC voltage network 8 and the second AC voltage network 13 are each configured with a ring topology (ring bus).

The invention claimed is:

1. An arrangement, comprising:
a first group of rectifiers having a DC voltage side connected to form a series circuit on the DC voltage side, and an AC voltage side to be connected to a first AC voltage network;
a plurality of switching devices;
a reserve rectifier having an AC voltage side and a DC voltage side, wherein, on occasion of a fault of one of said rectifiers of said first group of rectifiers, said AC voltage side of said reserve rectifier is to be electrically connected by way of a respective said switching device of said plurality of switching devices to the first AC voltage network and said DC voltage side of said reserve rectifier is to be connected to a first DC voltage line to form an augmented series circuit with said rectifiers of said first group of rectifiers.

2. The arrangement according to claim 1, which further comprises:
a second group of rectifiers having a DC voltage side connected to form a series circuit on the DC voltage side, and an AC voltage side to be connected to a second AC voltage network;
wherein said reserve rectifier, in the event of a fault on one of said rectifiers in the first group, is electrically connectable by appropriate said switching devices to the first AC (New) voltage network, and on the DC voltage side to a second DC voltage line to form the augmented series circuit with said rectifiers in said first group of rectifiers.

3. The arrangement according to claim 2, wherein said reserve rectifier, in the event of a fault on one of said rectifiers in said second group of rectifiers, is electrically connectable by appropriate said switching devices to the second AC voltage network, and on said DC voltage side to the second DC voltage line to form the augmented series circuit with the rectifiers in said second group of rectifiers.

4. The arrangement according to claim 3, wherein said reserve rectifier, in the event of a fault on one of the rectifiers in said second group of rectifiers, is electrically connectable by appropriate said switching devices to the second AC voltage network, and on the DC voltage side to the first DC voltage line to form the augmented series circuit with the rectifiers in said second group of rectifiers.

5. The arrangement according to claim 4, wherein, in the event of a fault on the first DC voltage line, said first group of rectifiers is connectable by appropriate said switching devices to the second DC voltage line.

6. The arrangement according to claim 5, wherein, in the event of a fault on the second DC voltage line, said second group of rectifiers is connectable by appropriate said switching devices to the first DC voltage line.

7. The arrangement according to claim 1, which further comprises a first network-commutated or self-commutated converter having a DC voltage side to be electrically connected to the first DC voltage line and an AC voltage side to be connected to a first energy supply network.

8. The arrangement according to claim 7, which further comprises a second network-commutated or self-commutated converter having a DC voltage side to be connected to the second DC voltage line and an AC voltage side to be connected to a second energy supply network.

9. An installation for transmitting electric power between a first wind farm with at least one wind turbine and a first energy supply network, the installation comprising an arrangement according to claim 1, wherein the first group of rectifiers is connectable to the first wind farm by way of the first AC voltage network.

10. The installation according to claim 9, wherein the installation is configured for transmitting electric power between a second wind farm and a second energy supply network, wherein the second group of rectifiers is connectable to the second wind farm by way of the second AC voltage network.

11. The installation according to claim 9, which comprises at least one network-commutated or self-commutated converter arranged onshore, and wherein said rectifiers are arranged offshore.

12. The installation according to claim 11, wherein said at least one converter is a modular multi-stage converter.

13. The installation according to claim 9, wherein said rectifiers are diode rectifiers.

14. The installation according to claim 9, wherein each said rectifier is bridgeable by way of a bypass switch.

15. The installation according to claim 9, which comprises a plurality of groups of diode rectifiers and a plurality of converters, which are interconnected on the DC voltage side by DC voltage lines, and wherein the DC voltage lines are interconnected in a multi-terminal or meshed network arrangement.

* * * * *